(12) United States Patent
Chang

(10) Patent No.: US 11,265,445 B1
(45) Date of Patent: Mar. 1, 2022

(54) METHODS AND SYSTEM FOR CHECKING ICC PROFILE CHARACTERISTICS

(71) Applicant: Kyocera Document Solutions Inc., Osaka (JP)

(72) Inventor: Michael M. Chang, El Segundo, CA (US)

(73) Assignee: Kyocera Document Solutions Inc., Osaka (JP)

(*) Notice: Subject to any disclaimer, the term of this patent is extended or adjusted under 35 U.S.C. 154(b) by 0 days.

(21) Appl. No.: 17/337,655

(22) Filed: Jun. 3, 2021

(51) Int. Cl.
*H04N 1/60* (2006.01)
*G06K 15/02* (2006.01)

(52) U.S. Cl.
CPC ....... *H04N 1/6025* (2013.01); *G06K 15/1802* (2013.01); *H04N 1/6008* (2013.01)

(58) Field of Classification Search
CPC .......................... H04N 1/6025; H04N 1/6008
See application file for complete search history.

(56) References Cited

U.S. PATENT DOCUMENTS

| | | | | |
|---|---|---|---|---|
| 2003/0046019 A1* | 3/2003 | Kumada | ............... | H04N 1/6055 702/127 |
| 2003/0081831 A1* | 5/2003 | Fukao | ................. | H04N 1/6025 382/167 |
| 2005/0128498 A1* | 6/2005 | Matsuzaki | ............. | H04N 1/603 358/1.9 |
| 2007/0002342 A1* | 1/2007 | Morales | ............... | H04N 1/6055 358/1.9 |
| 2007/0030505 A1* | 2/2007 | Ito | ........................ | H04N 1/6033 358/1.9 |
| 2007/0211268 A1* | 9/2007 | Sixbey | ................. | H04N 1/6025 358/1.9 |
| 2015/0161488 A1* | 6/2015 | Okumura | ........... | G06K 15/1868 358/1.9 |
| 2015/0172511 A1* | 6/2015 | Matsuzaki | ......... | H04N 1/00005 358/3.23 |
| 2016/0165099 A1* | 6/2016 | Sawatzki | ............... | H04N 1/603 358/1.9 |
| 2016/0261775 A1* | 9/2016 | Jung | .................... | H04N 1/6055 |
| 2019/0199888 A1* | 6/2019 | Morikawa | .......... | G06K 15/1878 |
| 2019/0301941 A1* | 10/2019 | Kawabata | ............... | H04N 1/60 |

* cited by examiner

*Primary Examiner* — Ted W Barnes
(74) *Attorney, Agent, or Firm* — Millen, White, Zelano & Branigan, P.C.; William Nixon

(57) ABSTRACT

Color conversion attempt to reproduce an input CMYK combination on a print media using an output CMYK combination. In a 2-step process, ICC profiles are used for the color conversion. In some instances, a 1-step process may be used that avoids the use of the ICC profiles and provides a faster processing time. A color progression checker determines whether the 1-step process may be used for color conversions based on standard deviations of the colorants along paths within a three-dimensional look-up table for a destination ICC profile. If a certain number of standard deviations exceed 20%, then the 1-step process for color conversion may not be effective.

20 Claims, 11 Drawing Sheets

METHODS AND SYSTEM FOR CHECKING ICC PROFILE CHARACTERISTICS

FIELD OF THE INVENTION

The present invention relates to checking ICC profile colorant progression and detecting potential color degradation at a printing device within a color printing system.

DESCRIPTION OF THE RELATED ART

Color management is one of the more complex aspects of color printing. Two operations may be performed for production print color management, calibration and ICC profile creation. In color management, an ICC profile is a set of data that characterizes a color input or output device, or a color space, according to standards promulgated by the International Color Consortium (ICC). Calibration provides a stable foundation on which ICC profiling can be implemented. Calibration may be relatively straight-forward as opposed to ICC profile creation.

Color conversion in the digital front end (DFE) of a printing device may be implemented as a "1-step" conversion for production printing operations. While this enables performant color conversion, this type of color conversion relies on the use of an interpolation grid. The interpolation grid is sensitive to colorant discontinuity, which impacts any 1-step color conversion process. In order to ensure accurate 1-step color conversion, ICC profiles must have smooth color progression.

SUMMARY OF THE INVENTION

A method for checking certain ICC profile characteristics is disclosed. The method includes accessing a look-up table associated with the ICC profile stored on a printing device. The method also includes identifying a plurality of locations on a plane within the look-up table. Each location includes a path that extends from a minimum value to a maximum value in a direction perpendicular to the plane. The method also includes collecting data points. Each point is associated with multiple components. Each component is numerical value within the look-up table along the path between the minimum value and the maximum value. The method also includes determining a difference value between each pair of consecutive data points for each component within each path for each of the plurality of locations on the plane. The method also includes calculating a standard deviation of the difference values of each component for each path. The method also includes determining that the ICC profile exhibits possible degradation in color reproduction if a specified number of the standard deviations exceed a threshold.

A method for determining potential color printing degradation is disclosed. The method includes accessing a three-dimensional look-up table of a destination ICC profile stored on a printing device. The method also includes identifying five locations of a plane within the look-up table. The five locations include a neutral point and a center point of each quadrant of the plane. The method also includes generating a path at each location. The path extends perpendicularly to the plane at its respective location from a minimum value to a maximum value. The method also includes capturing data points by varying values incrementally along the path at each location. The data points correspond to values for each of four primary colors of cyan, magenta, yellow, and black. The method also includes determining a difference value between consecutive points for each of the four primary colors at each respective location. The method also includes calculating a standard deviation for the difference values for each of the four primary colors at each respective location for a total number of twenty standard deviations. The method also includes sending a warning if a number of the total number of standard deviations exceed a threshold.

A printing device is disclosed. The printing device includes a processor. The printing device also includes a memory connected to the processor. The memory stores instructions that, when executed by the processor, configures the printing device to access a look-up table associated with an ICC profile stored on the printing device. The printing device also is configured to identify a plurality of locations on a plane within the look-up table. Each location includes a path that extends from a minimum value to a maximum value in a direction perpendicular to the plane. The printing device also is configured to collect data points. Each point is associated with multiple components. Each component is numerical value within the look-up table along the path between the minimum value and the maximum value. The printing device also is configured to determine a difference value between each pair of consecutive data points for each component within each path for each of the plurality of locations on the plane. The printing device also is configured to calculate a standard deviation of the difference values of each component for each path. The printing device also is configured to determine that the ICC profile exhibits possible degradation in color reproduction if a specified number of the standard deviations exceeds a threshold.

BRIEF DESCRIPTION OF THE DRAWINGS

Various other features and attendant advantages of the present invention will be more fully appreciated when considered in conjunction with the accompanying drawings.

DETAILED DESCRIPTION OF THE PREFERRED EMBODIMENTS

Reference will now be made in detail to specific embodiments of the present invention. Examples of these embodiments are illustrated in the accompanying drawings. Numerous specific details are set forth in order to provide a thorough understanding of the present invention. While the embodiments will be described in conjunction with the drawings, it will be understood that the following description is not intended to limit the present invention to any one embodiment. On the contrary, the following description is intended to cover alternatives, modifications, and equivalents as may be included within the spirit and scope of the appended claims.

The disclosed embodiments may utilize the following definitions:

Printer calibration—a process for ensuring consistent color quality generated by printing devices.

Test color patch—an area, which may be rectangular, containing a single color on a test color sheet.

Test color strip—a series or row of test color patches on a printed test color sheet.

Control strip—a test color strip that also contains encoded information.

Test chart print job—a printed page, containing rows of test color strips, used for printing device calibration.

Color measurement tool—a tool, such as a spectrophotometer, for measuring color patches on a test color sheet. The measurement data may consist of International Commission on Illumination (CIE) XYZ or CIELAB values. CIELAB may refer to a color space specified by the CIE to describe all the colors visible to the human eye that are used as a device-independent reference.

Certain ICC profiles for printing devices yield low precision outputs when used in common practical high-speed 1-step color conversion. The features of 1-step color conversion is disclosed in greater detail below. The disclosed embodiments check for this potential problem before having to deal with low precision color conversion results. Methods to check for characteristics of the ICC profiles is implemented. Methods also may be implemented to predict if a low precision 1-step conversion will result.

Figure 1:
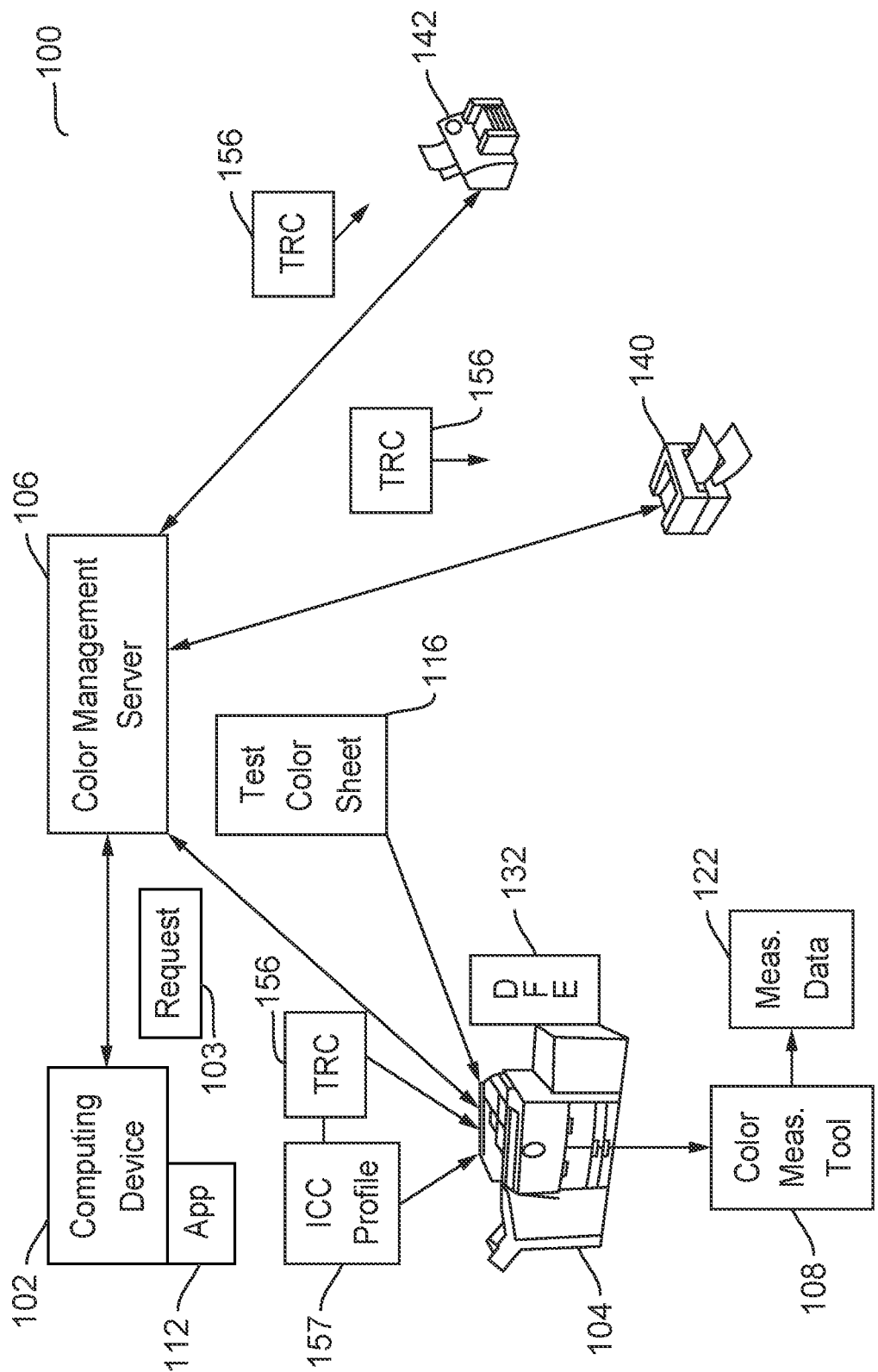
FIG. 1 illustrates a block diagram of a color management system for printing devices according to the disclosed embodiments.

FIG. 1 depicts a color management system 100 for printing devices 104, 140, and 142 according to the disclosed embodiments. Color management system 100 includes a color management server 106. Color management server 106 may be a server that registers all printing devices within system 100 and controls color management operations for the printing devices. In some embodiments, color management system 100 may be a system or network within a print shop having several or more printing devices.

Printing devices 104, 140, and 142 may receive print jobs from other devices within system 100. They also may receive calibration print jobs and quality checks from color management server 106. Test chart 116 may be generated to perform calibrations, disclosed in greater detail below. Other items and data files may be sent to printing devices 104, 140, and 142. Further, the printing devices may provide data and information to color management server 106 so that it may manage color printing operations within system 100.

In some embodiments, computing device 102 may include an application 112 that generates data for printing that is sent to color management server 106. Color management server 106 also may exchange data with printing device 104 for performing calibration operations, specifically color calibration. Color management server 106 is a server that manages print jobs and tasks between a plurality of printing devices 104, 140, and 142. Color management server 106 also provides calibration operations to the printing devices. An operator may perform calibration tasks for the plurality of printing devices using color management server 106 using computing device 102. In some embodiments, computing device 102 is incorporated with color management server 106.

Preferably, color management server 106 allows for inspection, calibration, and profiling for management of color print jobs. Color management server 106 may act as a software as a service (SaaS) solution that provides color management. The service enables repeatable color reproduction at the printing devices. Color management server 106 also may manage digital front ends (DFEs) from production printing which include paper catalogs. These paper catalogs may include paper measurements and paper color measurement profiles. For example, printing device 104 includes DFE 132.

In some embodiments, an operator may request calibration for printing device 104 within system 100. The user may utilize application 112 on computing device 102 to generate calibration request 103 for printing device 104. Calibration request 103 may include a request type, a printing device identification, and a media/paper identification. In order to ensure the best possible color reproduction, production printing devices may associate the retained color management profiles with specific paper media. Most printing devices may use hundreds of different paper types, with each paper resulting in printing and measuring color patches. Thus, the user may generate and send a large number of requests for calibrations of these different types of papers at once.

Color management server 106 receives calibration request 103 within system 100. Color management server 106 generates a test chart 116 to obtain measurement data for the paper at printing device 104. Test chart 116 includes color patches used to perform calibration operations. Test charts 116 may use colorant ramps for each colorant. Test chart 116 is forwarded to printing device 104, which prints it out on the indicated paper/media type. An operator takes test chart 116. The operator may use color measurement tool 108 to measure the color patches on test chart 116 to obtain measurement data 122. Alternatively, printing device 104 may include inline measurement tools that automatically measure the color patches within test chart 116.

The operator or printing device measures calibration chart 116 after it is printed out at the printing device. Measurement data 122 is captured by measuring the color patches and the printed colors associated therewith. The data is provided back to color management server 106 for analysis. Using the measured data, color management server 106 generates calibration tone reproduction curves (TRCs) 156 using calibration settings that may be set by the operator or system 100. Calibration settings may include end point targets and aims for the colors. Once the calibration TRCs 156 are created, they are downloaded to the printing device or devices. Alternatively, if calibration is implemented at the printing device, then calibration TRCs 156 may be stored in digital front end (DFE) 132. In some embodiment, a TRC 156 may be stored in multiple printing devices within system 100. Calibration TRCs 156 also may be associated with ICC profile 157 that is sent to printing device 104. ICC profile 157 may be built upon calibrated output such as measurement data 122. ICC profile creation is disclosed in greater detail below.

Figure 2:
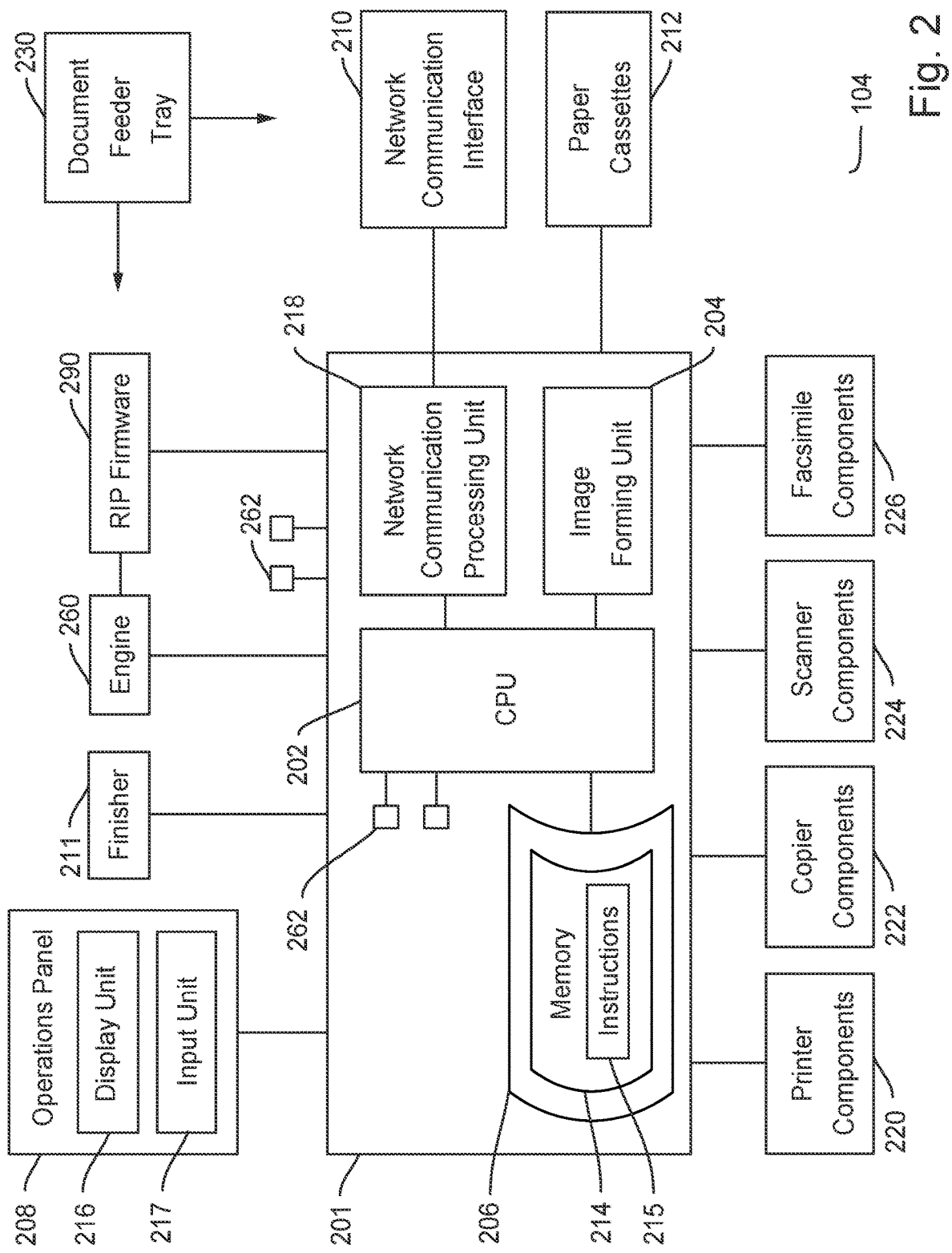
FIG. 2 illustrates a block diagram of components of a printing device according to the disclosed embodiments.

FIG. 2 depicts a block diagram of components of printing device 104 according to the disclosed embodiments. In the disclosure of FIG. 2, printing device 104 may be referred to for illustrative purposes. The architecture shown in FIG. 2 may apply to any multi-functional printing device or image forming apparatus that performs various functions, such as printing, scanning, storing, copying, and the like within system 100. As disclosed above, printing device 104 may send and receive data from color management server 106 and other devices within system 100.

Printing device 104 includes a computing platform 201 that performs operations to support these functions. Computing platform 201 includes a computer processing unit (CPU) 202, an image forming unit 204, a memory unit 206, and a network communication interface 210. Other components may be included but are not shown for brevity. Printing device 104, using computing platform 201, may be configured to perform various operations, such as scanning, copying, printing, receiving or sending a facsimile, or document processing. As such, printing device 104 may be a printing device or a multi-function peripheral including a scanner, and one or more functions of a copier, a facsimile device, and a printer. To provide these functions, printing device 104 includes printer components 220 to perform printing operations, copier components 222 to perform copying operations, scanner components 224 to perform scanning operations, and facsimile components 226 to receive and send facsimile documents. CPU 202 may issue instructions to these components to perform the desired operations.

Printing device 104 also includes a finisher 211 and one or more paper cassettes 212. Finisher 211 includes rotatable downstream rollers to move papers with an image formed surface after the desired operation to a tray. Finisher 211 also may perform additional actions, such as sorting the finished papers, binding sheets of papers with staples, doubling, creasing, punching holes, folding, and the like. Paper cassettes 212 supply paper to various components 220, 222, 224, and 226 to create the image formed surfaces on the papers. Paper cassettes 212 may include papers having various sizes, colors, composition, and the like. Paper cassettes 212 may be removed to refill as needed.

Document processor input feeder tray 230 may be the physical components of printing device 104 to receive papers and documents to be processed. A document is placed on or in document processor input feeder tray 230, which moves the document to other components within printing device 104. The movement of the document from document processor input feeder tray 230 may be controlled by the instructions input by the user. For example, the document may move to a scanner flatbed for scanning operations. Thus, document processor input feeder tray 230 provides the document to scanner components 220. As shown in FIG. 2, document processor input feeder tray 230 may interact with engine 260 to perform the desired operations.

Memory unit 206 includes memory storage locations 214 to store instructions 215. Instructions 215 are executable on CPU 202 or other processors associated with printing device 104, such as any processors within components 220, 222, 224, or 226. Memory unit 206 also may store information for various programs and applications, as well as data specific to printing device 104. For example, a storage location 214 may include data for running an operating system executed by computing platform 201 to support the components within printing device 104. According to the disclosed embodiments, memory unit 206 may store the tokens and codes used in performing the deferral operations for printing device 104.

Memory unit 206 may comprise volatile and non-volatile memory. Volatile memory may include random access memory (RAM). Examples of non-volatile memory may include read-only memory (ROM), flash memory, electrically erasable programmable read-only memory (EEPROM), digital tape, a hard disk drive (HDD), or a solid-state drive (SSD). Memory unit 206 also includes any combination of readable or writable volatile memories or non-volatile memories, along with other possible memory devices.

Computing platform 201 may host one or more processors, such as CPU 202. These processors are capable of executing instructions 215 stored at one or more storage locations 214. By executing these instructions, the processors cause printing device 104 to perform various operations. The processors also may incorporate processing units for specific purposes, such as application-specific integrated circuits (ASICs) and field programmable gate arrays (FPGAs). Other processors may be included for executing operations particular to components 220, 222, 224, and 226. In other words, the particular processors may cause printing device 104 to act as a printer, copier, scanner, and a facsimile device.

Printing device 104 also includes an operations panel 208, which may be connected to computing platform 201. Operations panel 208 may include a display unit 216 and an input unit 217 for facilitating interaction with a user to provide commands to printing device 104. Display unit 216 may be any electronic video display, such as a liquid crystal display (LCD). Input unit 217 may include any combination of devices that allow users to input information into operations panel 208, such as buttons, a touch screen, a keyboard or keypad, switches, dials, and the like. Preferably, input unit 217 includes a touch-screen digitizer overlaid onto display unit 216 that senses touch to receive inputs from the user. By this manner, the user interacts with display unit 216. Using these components, one may enter codes or other information into printing device 104.

Printing device 104 also includes network communication processing unit 218. Network communication processing unit 218 may establish a network communication using network communication interface 210, such as a wireless or wired connection with one or more other image forming apparatuses or a network service. CPU 202 may instruct network communication processing unit 218 to transmit or retrieve information over a network using network communication interface 210. As data is received at computing platform 201 over a network, network communication processing unit 218 decodes the incoming packets and delivers them to CPU 202. CPU 202 may act accordingly by causing operations to occur on printing device 104. CPU 202 also may retrieve information stored in memory unit 206, such as settings for printing device 104.

Printing device 104 also includes engine 260. Engine 260 may be a combination of hardware, firmware, or software components that act accordingly to accomplish a task. For example, engine 260 is comprised of the components and software to print a document. It may receive instructions from computing platform 201 after user input via operations panel 208. Alternatively, engine 260 may receive instructions from other attached or linked devices.

Engine 260 manages and operates the low-level mechanism of the printing device engine, such as hardware components that actuate placement of toner onto paper. Engine 260 may manage and coordinate the half-toner, toner cartridges, rollers, schedulers, storage, input/output operations, and the like. Raster image processor (RIP) firmware 290 that interprets the page description languages (PDLs) would transmit and send instructions down to the lower-level engine 260 for actual rendering of an image and application of the ink onto paper during operations on printing device 104.

Printing device 104 may include one or more sensors 262 that collect data and information to provide to computing platform 201 or CPU 202. Each sensor 262 may be used to monitor certain operating conditions of printing device 104. Sensors 262 may be used to indicate a location of a paper jam, failure of hardware or software components, broken parts, operating system problems, document miss-feed, toner level, as well as other operating conditions. Sensors 262 also may detect the number of pages printed or processed by printing device 104. When a sensor 262 detects an operational issue or failure event, it may send a signal to CPU 202. CPU 202 may generate an error alert associated with the problem. The error alert may include an error code.

Some errors have hardware-related causes. For example, if a failure occurred in finisher 211, such as a paper jam, display unit 216 may display information about the error and the location of the failure event, or the finisher. In the instance when the paper jam occurs in paper cassettes 212, display unit 216 displays the information about the jam error as located in one of the paper cassettes.

Some errors have a type of firmware-related cause. For example, network communication processing unit 218 may cause a firmware or software error. Display unit 216 may display the firmware-related error, any applicable error codes, and provide recommendations to address the error, such as reboot the device.

Memory unit 206 may store the history of failure events and occurred errors with a timestamp of each error. Printing device 104 communicates with color management server 106 via network communication interface 210 by utilizing a network protocol, such as the ones listed above. In some embodiments, printing device 104 communicates with color management server 106 through REST API, which allows the server to collect data from multiple devices within system 100. REST API and SOAP are application protocols used to submit data in different formats, such as files, XML messages, JSON messages, and the like. By utilizing applicable network communication protocols and application protocols, printing device 104 submits and receives data from color management server 106.

Figure 3:
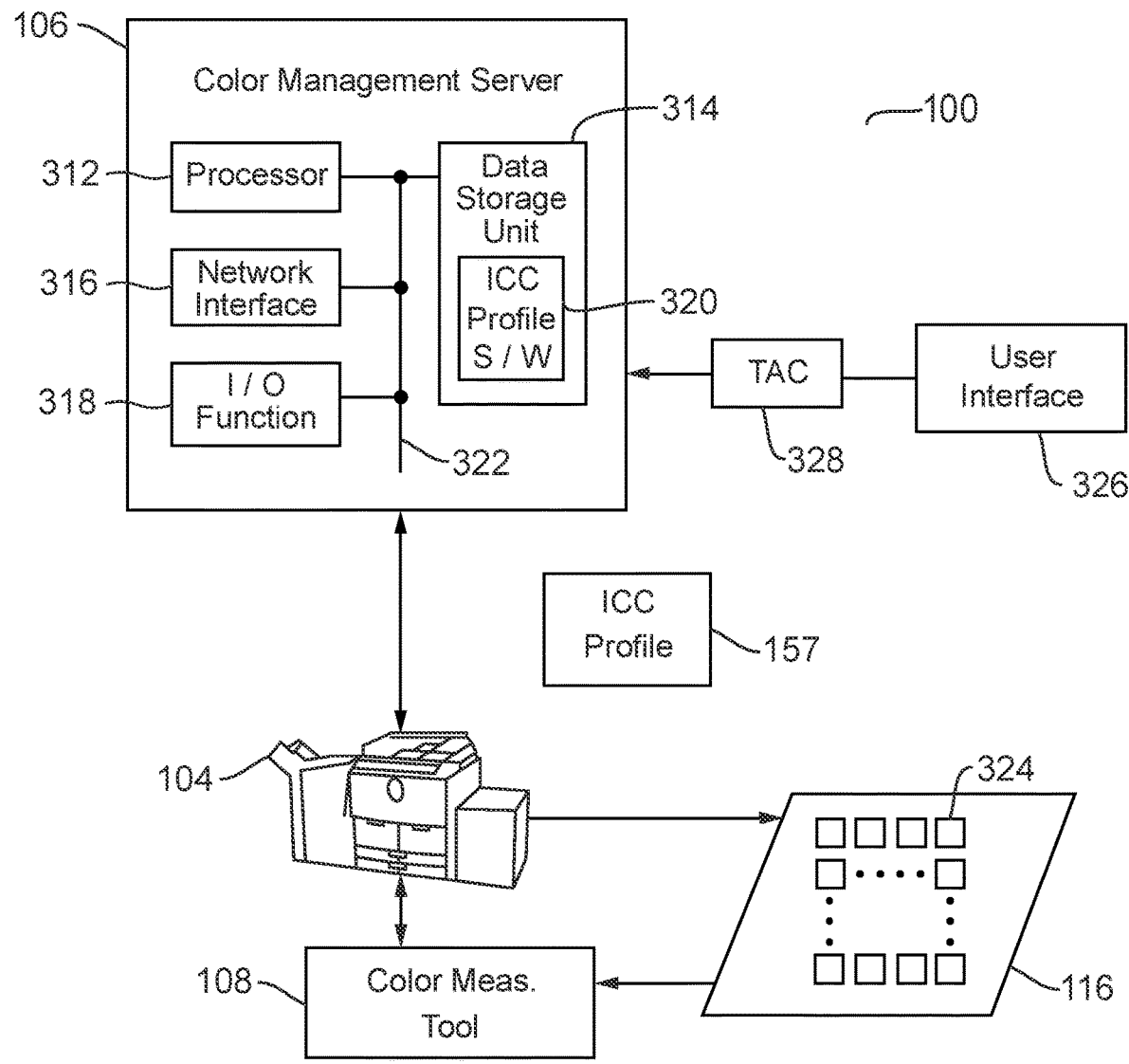
FIG. 3 illustrates a block diagram of the creation of an ICC profile at a printing device according to the disclosed embodiments.

FIG. 3 depicts a block diagram of the creation of ICC profile 157 at printing device 104 or color management server 106 according to the disclosed embodiments. System 100 of FIG. 1 is shown with emphasis on creating ICC profile 157. Color management server 106 also is shown. As disclosed above, color management server 106 may be any type of computing device capable of executing existing ICC profile maker software, such as a server, mobile phone, tablet computer, wearable computer, desktop computer, laptop computer, etc. In some embodiments, color management server 106 may operate as a part of printing device 104. For instance, color management server 106 may be located in DFE 132 and may operate the operating system of printing device 104. Thus, printing device 104 may execute the processes disclosed below. In other embodiments, color management server 106 and printing device 104 may be physically separate devices.

As shown in FIG. 3, color management server 106 includes a processor 312, data storage 314, network interface 316, and input/output function 318, all of which may be coupled by a system bus 322 or a similar mechanism. It should be understood that the examples of a computing device are provided for illustrative purposes. Further, in addition to and/or alternatively to the examples above, other combinations and/or sub combinations of a printer, computer, and server may also exist, amongst other possibilities, without departing from the scope of the embodiments herein.

Processor 312 may include one or more central processing units (CPUs), such as one or more general purpose processors and/or one or more dedicated processors (e.g., application specific integrated circuits also known as ASICs or digital signal processors also known as DSPs, etc.). Other types of processors can be used.

Data storage 314, in turn, may comprise volatile and/or non-volatile data storage and can be integrated in whole or in part with processor 312. Data storage 314 may store program instructions, executable by the processor 312, and data that are manipulated by these instructions to carry out the various methods, processes, or functions described herein. Alternatively, these methods, processes, or functions can be defined by hardware, firmware, and/or any combination of hardware, firmware and software. Therefore, data storage 314 may include a tangible, non-transitory computer-readable medium, having stored thereon program instructions that, upon execution by one or more processors, cause color management server 106 to carry out any of the methods, processes, or functions disclosed in this specification or the accompanying drawings.

In the embodiment shown in FIG. 3, data storage 314 may store ICC profile software 320, which can be executed by processor 312 to create and modify ICC profiles. ICC profile software 320 also may be known as the ICC profile creation tool. The ICC profile software 320 may correspond to conventional profile creation tools designed to create ICC profiles, such as ICC profile 157. In some embodiments, data storage 314 may also store one or more ICC profiles for use by one or more printing devices, such as printing device 104. The ICC profiles may be generated by the ICC profile software 320 or obtained from other computing devices through wired or wireless communication.

Network interface 316 may take the form of a wire line connection, such as an Ethernet, Token Ring, or T-carrier connection. Network interface 316 may alternatively take the form of a wireless connection, such as WiFi, BLUETOOTH®, or a wide-area wireless connection. However, other forms of physical layer connections and other types of standard or proprietary communication protocols may be used over network interface 316. Furthermore, network interface 316 may comprise multiple physical communication interfaces.

Input/output function 318 may facilitate user interaction with color management server 106. Input/output function 318 may comprise multiple types of input devices, such as a keyboard, a mouse, a touch screen, a microphone, or any other device that is capable of receiving input from a user. Similarly, input/output function 318 may comprise multiple types of output devices, such as a display, printer, one or more light emitting diodes (LEDs), speaker, or any other device that is capable of providing output discernible to a user. Alternatively, for example, color management server 106 may support remote access from another device, via network interface 316 or via another interface (not shown), such as an RS-132 or Universal Serial Bus (USB) port.

System 100 may enable the generation of new ICC profiles, such as the ICC profile 157. To illustrate an example ICC profile generation process, system 100 may initiate the generation of the new ICC profile by causing printing device 104 to print a test chart 116 based on a source color space, such as a cyan-magenta-yellow-black profile chart, as shown by color patches 324. Printing device 104 may print test chart 116 using a 4D-LUT ink limiter that limits the ink total of the different CMYK ink combinations making up the various color segments of test chart 116. In particular, each CMYK ink combination would be equal to or below the ink limit.

Test chart 116 can be measured by a color measurement tool 108, such as a spectrophotometer. Color measurement tool 108 may obtain color measurements of the different color segments, or color patches 324, of test chart 116, which can be used by the ICC profile software 320 to generate an initial ICC printer profile based on measurement data 122. Color management server 106 may then provide ICC profile 157 to one or more printers (e.g., printing device 104) and store ICC profile 157 at data storage unit 314.

Figure 4A:
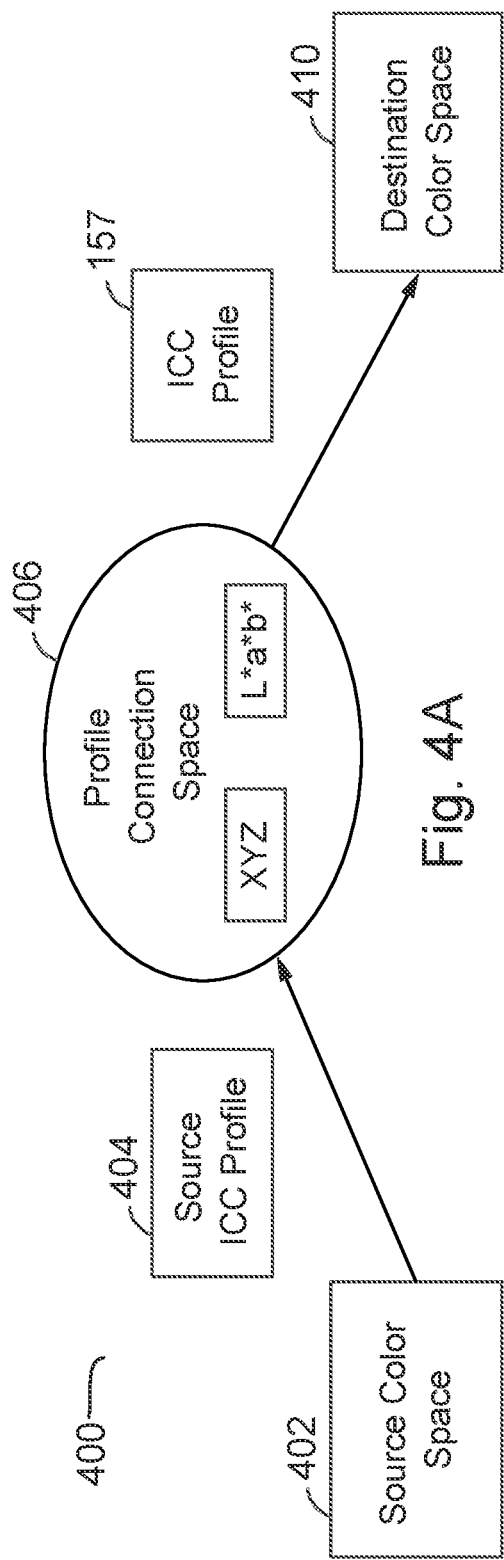
FIG. 4A illustrates a color conversion system for use with the color management system according to the disclosed embodiments.

FIG. 4A illustrates a color conversion system 400 for use with system 100 according to the disclosed embodiments. Color conversion system 400 represents a managed color workflow that offers color consistency and predictability during color conversion. As shown in FIG. 4A, color conversion system 400 includes a source color space 402, a source ICC profile 404, a profile connection space (PCS) 406, ICC profile 157, and a destination color space 410. Color conversion system 400 may be implemented on color management server 106 or printing device 104.

Color conversion system 400 may be used for color conversion from a source color space 402, or colors associated with a print job, to destination color space 410, or CMYK ink combinations that a printing device can print. Color conversion system 400 seeks to reproduce the input color at the output, or printing device. Color matching occurs between different devices or numerical representations.

Color conversion system 400 may involve initially obtaining the source color space 402, which may represent colors used by a source device (e.g., a computer monitor, a scanner). Some examples of the source color space can include an RGB color space, a CMYK color space, and a CMYKOGV color space.

Color conversion system 400 further involves identifying a source ICC profile 404 that corresponds to source color space 402. Source ICC profile 404 may provide a mapping for colors within source color space 402 to PCS 406. For example, source ICC profile 404 may store one or more LUTs that can be used to map source color space 402 to the L*a*b* color space or to the XYZ color space for PCS 406. Alternatively, source ICC profile 404 can include one or more equations for mapping source color space 402 to the L*a*b* color space or to the XYZ color space for PCS 406.

PCS 406 can serve as the interface which provides an unambiguous connection between input profiles, such as source ICC profile 404, and output profiles, such as ICC profile 157 within color conversion system 400. PCS 406 can allow the profile transforms for input, display, and output devices to be decoupled so that they can be produced independently. As such, PCS 406 can serve as the virtual destination for input transforms and the virtual source for output transforms. When the input and output transforms are based on the same PCS definition, even though they are created independently, the input and output transforms can be paired arbitrarily at run time by a color-management module (CMM), such as color conversion system 400, and will yield consistent and predictable results when applied to color values.

ICC profile 157 may enable mapping colors from PCS 406 to destination color space 410. In particular, ICC profile 157 may provide a mapping for colors within PCS 406 to destination color space 410. For example, ICC profile 157 may store one or more LUTs that can be used to map input colors from PCS 406, or the L*a*b* color space, to the CMYK color space associated with destination color space 410. Alternatively, ICC profile 157 can include one or more equations for mapping colors from PCS 406 to destination color space 410. In some instances, the selection of ICC profile 157 may depend on the type of printing device performing the print job using destination color space 410.

Figure 4B:
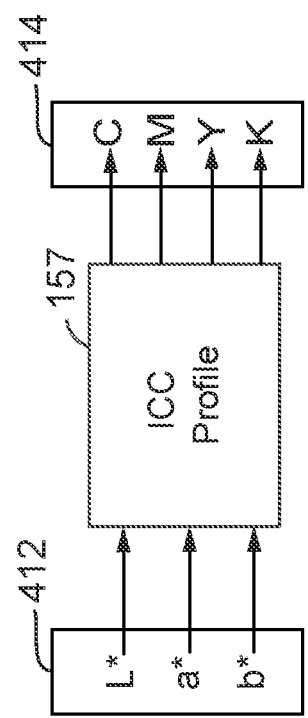
FIG. 4B further illustrates the color conversion system according to the disclosed embodiments.

FIG. 4B illustrates inputs and outputs for ICC profile 157 according to the disclosed embodiments. As shown, ICC profile 157 may represent a destination ICC profile configured to enable a device to map input L*a*b* values 412 obtained from PCS 406 shown in FIG. 4A to output CMYK values 414 used to complete the print job. For instance, ICC profile 157 can store one or more LUTs, such as a LUT for mapping colors from the L*a*b* color space to destination color space 410. These LUTs may be known as B2A look-up tables.

Referring to FIGS. 3, 4A, and 4B, original content with reference to device independent color is input to printing device 104. Color conversion system 400 attempts to produce a color match based on the input device independent color specification and available printing device colorants. A key piece in this workflow is the ICC profile. Source ICC profile 404 ties colors of the input content of source color space 402 to device independent measures. ICC profile 157, or destination ICC profile, provides information on how to convert the device independent input colors to printing device CMYK value 414. Thus, an important step in setting up a printing device is the creation of ICC profile 157 as the destination ICC profile. More specifically, an ICC profile 157 should be created for each specific media brand/type and model, along with the particular printing conditions.

Printing device characterization occurs with ICC profile software 320 that relates printing device CMYK quantities, in terms of their raw measurements, to device independent color values, which leads to creation of ICC profile 157. Multiple settings should be determined to process and package the printing device characterization data into an ICC profile. Settings may include the size and the precision of the conversion tables, the K colorant usage, the handling of out of gamut input colors, and the like.

FIGS. 4A and 4B depict a 2-step process for conversion of an input color to an output color. It is called a 2-step process as the first step converts source color space 402 to PCS 406, based on the information in source ICC profile 404. In some embodiments, the conversion may use a 4-dimensional look-up-table (4D-LUT) from source ICC profile 404. These LUTs may be known as A2B tables. The second step may be converting PCS 406 to destination color space 410 based on the information in destination ICC profile 157. In some embodiments, the conversion may use a 3-dimensional look-up-table (3D-LUT) within destination ICC profile 157. As noted above, these may be known as B2A tables. PCS 406 may be set up to be CIE XYZ or CIE L*a*b* with a D50 White Point.

Figure 5A:
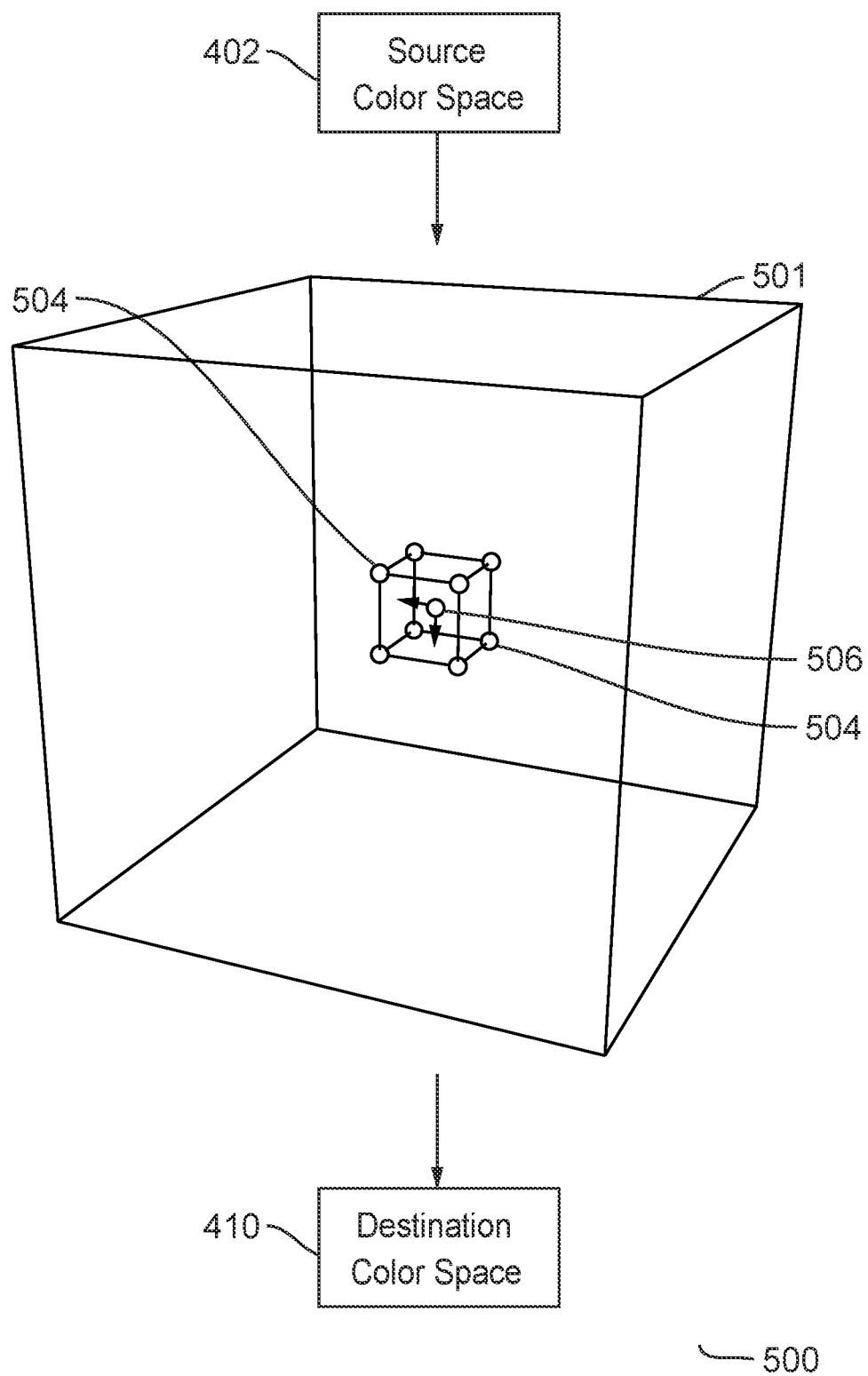
FIG. 5A illustrates a color conversion system to implement the 1-step color conversion process according to the disclosed embodiments.
Figure 5B:
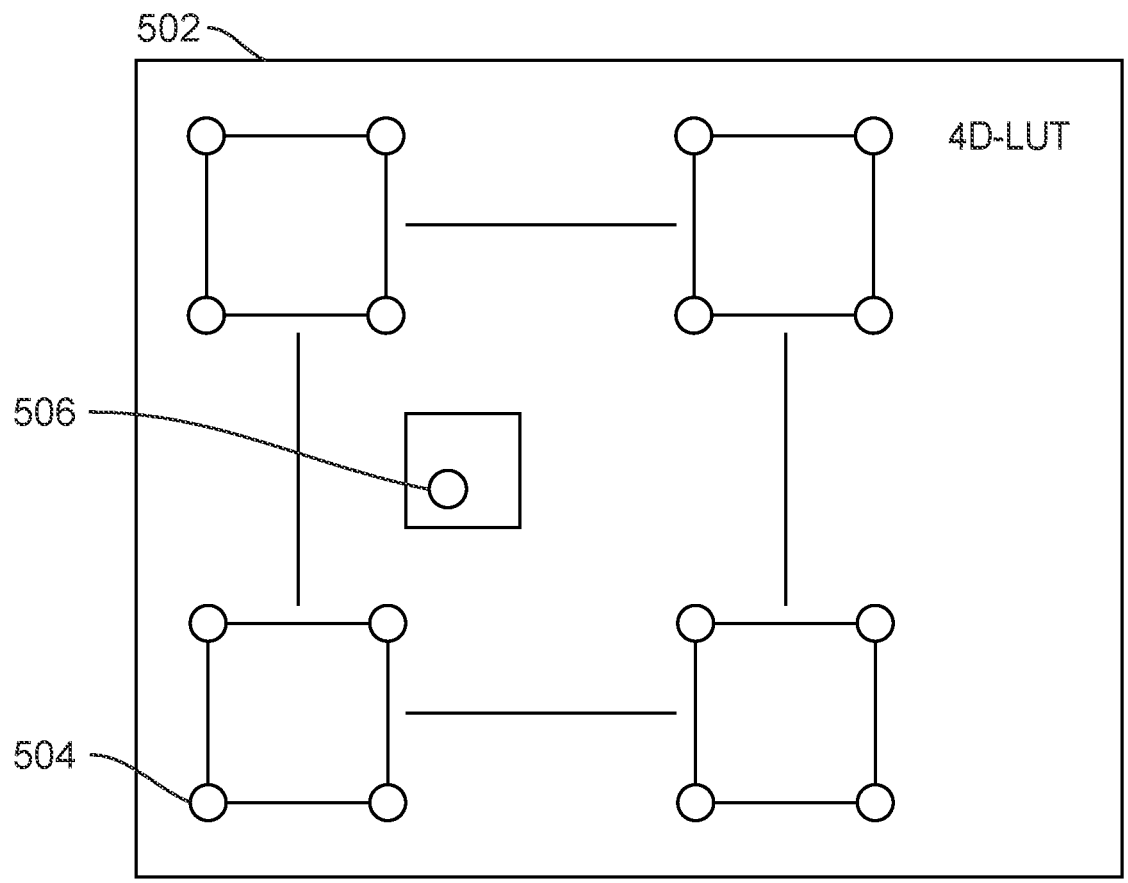
FIG. 5B further illustrates the color conversion system to implement the 1-step color conversion process according to the disclosed embodiments.

FIGS. 5A and 5B depict a color conversion system 500 to implement a 1-step color conversion process according to the disclosed embodiments. A 1-step color conversion process may be used in color conversion operations instead of the 2-step color conversion process disclosed above. The 1-step color conversion process also may be known as the practical method, as opposed to the "textbook" method of the 2-step color conversion process disclosed above. When a large number of source color data points exists within source color space 402, then the 2-step color conversion process using ICC profiles 404 and 157 may be burden on DFE 132. In some embodiments, the 2-step color conversion process may take up to 346% the time to execute the 1-step color conversion process.

In the 1-step color conversion process, an N-dimensional look-up-table (ND-LUT) 501 is generated, wherein N is the number of components of the source color which has L grid points per each of the N axes. The disclosed embodiments may use four components for the source color, or primary colors cyan, magenta, yellow, and black (CMYK). For each $L^N$ grid point of the ND-LUT 501, the disclosed embodiments compute, via the 2-step process disclosed above, the M-component output. These outputs are stored at each grid location. During actual conversion of source color data from source color space 402, the ND-LUT 501 is used for a 1-step ND interpolation computation to obtain the output. Thus, ICC profiles 404 and 157 are not used.

Thus, color conversion system 500 may generate and use 4D-LUT 502 as opposed to separate A2B and B2A tables. To build 4D-LUT 502, the disclosed embodiments make a sampling of the 2-step color conversion process on grid points 504 within 4D-LUT 502. Each grid point samples the original 2-step conversion value. An output 506 for an arbitrary input will be interpolated using the outputs of neighboring grid points 504. PCS 406 is skipped. Thus, a CMYK input is mapped to a particular location to find the output CMYK value. The CMYK input may not hit a grid point exactly so interpolation of neighboring grid points is done, preferably with a weighted average.

In other words, for each 4D-LUT grid point 504, the disclosed embodiments compute via the 2-step process the value corresponding to a CMYK input from source color space 402. For an arbitrary CMYK input, the disclosed embodiments do the 1-step interpolation of the output CMYK values stored in the neighboring grid points 504. Each grid point 504 of 4D-LUT 502 samples an input-output pair of the 2-step color conversion process. To find the output of an arbitrary input point, the interpolation works with the sampled input-output pairs. This process is robust if the 4D-LUT construction adequately samples the original 2-step process. The input-output sampling works well when the conversion exhibits smooth numerical progression among neighborhood points. The input CMYK-to-PCS first step, a measurement-based table, is inherently smooth.

There may be some issues with the 1-step process. A vulnerable point in the 2-step process is the second step involving the 3D-LUT of the B2A table of destination ICC profile 157. If there are rapid changes in the colorant usage in the 3D-LUT, then the sampling method to generate the 4D-LUT 502 for the 1-step process may fail to capture the actual behavior of the color conversion. Thus, it may be desirable to determine when such rapid changes occur to indicate that the 1-step process is not feasible.

In doing so, the disclosed embodiments should take into account the following considerations. The creation of A2B tables, or CMYK-to-L*a*b* tables, found in source ICC profile 404 is measurement based. The creation of B2A tables, or L*a*b*-to-CMYK tables, found in destination ICC profile 157 involve many design considerations to balance and compromise. For example, many CMYK combinations can match one input L*a*b* value. Further, black, or K, colorant usage impacts some features of color recreation. More K means a lower total amount to adhere to the ink limit. Less K, and more CMY, mean more robust gamut volume in the dark end.

Many feasible design strategies co-exist that result in many possible styles of CMYK combinations in the B2A 3D-LUTs for a variety of colorant usage. The optimization or merge of different styles of CMYK combinations, however, may likely hurt smoothness in color printing. The resulting printed image may not appear smooth. Yet, the approaches disclosed above are implemented in real-world cases. There are some features of the 2-step process given up when using the 1-step process disclosed by FIGS. 5A and 5B. In some examples, there may be a 10% or more disagreement between the output provided by the 2-step process and the output provided by the 1-step process. The 4D-LUT 502 fails to sample the original ICC profiles 404 and 157 quick changes. These quick changes may only be captured with interpolation of the 3D-LUT content as used by the B2A tables of destination ICC profile 157.

FIGS. 6A-B, 7, and 8 disclose an ICC profile colorant progression checker 800 that uses a colorant progression quality metric that measures how the usages of primary colors progress as a way to predict quality and precision within a specific ICC profile when it used in a 1-step color conversion process. The metric may be calculated as disclosed below. The step-by-step progression of each of the four colorants is captured in five (5) L*a*b* ramps or paths. This progression captures the differences in that colorant's value.

The five ramps, or paths, include a neutral ramp and one ramp for each L*a*b* hue quadrant. The number of data points captured depends on the ICC profile table sizes. A 16-bit ICC profile may have 65535 levels while an 8-bit ICC profile may have 256 levels.

The disclosed embodiments then compute the standard deviation of each of the progressions at the five locations, or 20 standard deviations. High quality ICC profiles have a standard deviation of less than 20% of the number of levels for each ramp. ICC profiles with more than four (4) standard deviations over 20% will have significant accuracy issues. The operator of printing device 104 using the ICC profile should be notified that the 1-step color conversion process may cause problems or should be avoided.

Figure 6A:
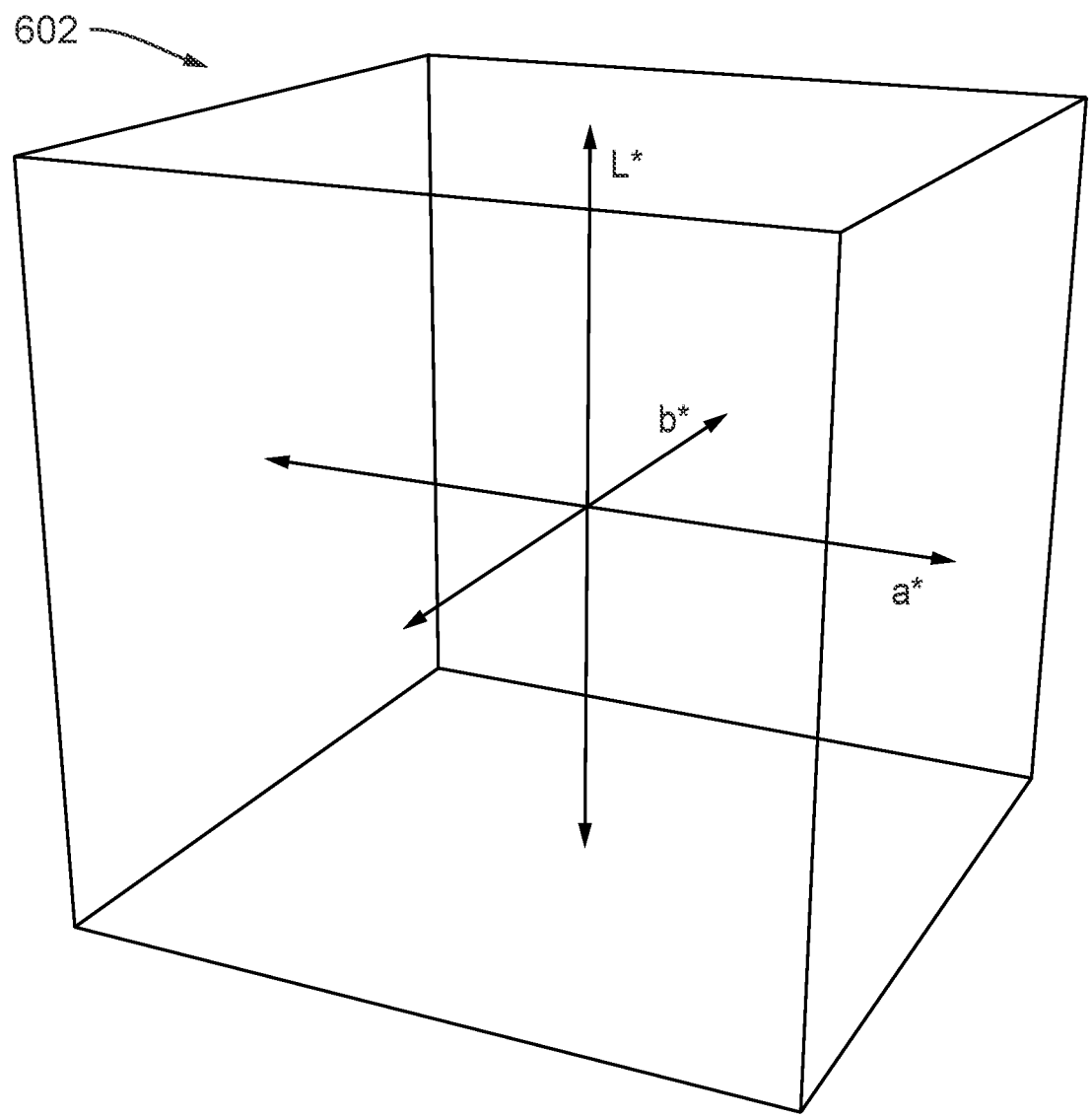
FIG. 6A illustrates a B2A, or destination, 3D-LUT having locations for use in colorant progression checking according to the disclosed embodiments.
Figure 6B:
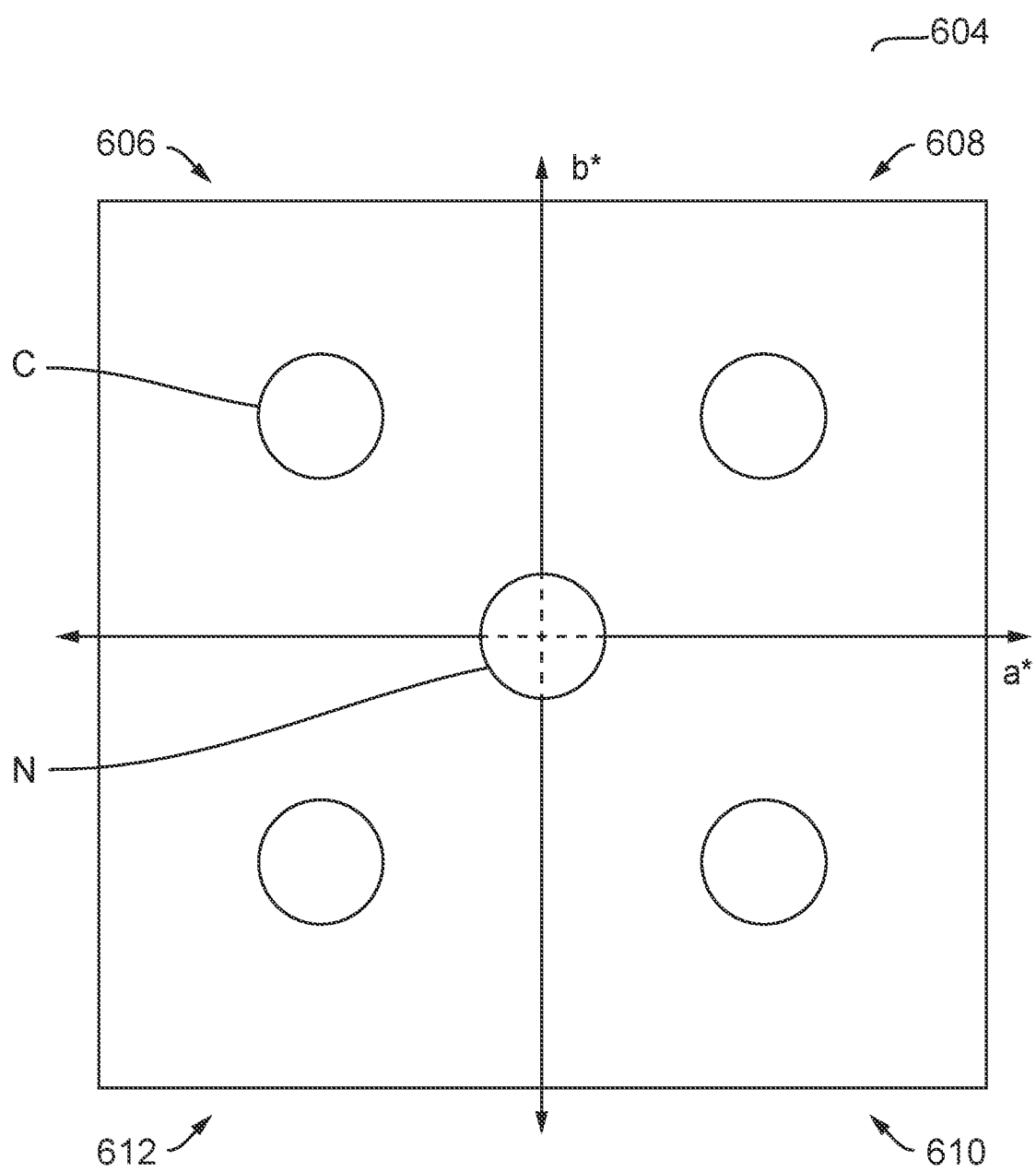
FIG. 6B illustrates a plane from the B2A 3D-LUT according to the disclosed embodiments.

FIG. 6A depicts a B2A, or destination, 3D-LUT 602 having locations for use in colorant progression checking according to the disclosed embodiments. FIG. 6B depicts a plane 604 from 3D-LUT 602 according to the disclosed embodiments. Destination 3D-LUT 602 may be represented by a three-dimensional model having an L* axis, an a* axis, and a b* axis that are used to determine output CMYK combinations. Planes using the a* and b* axes may be shown. A plane 604 may be found within 3D-LUT 602.

Plane 604 may be divided into four quadrants 606, 608, 610, and 612. Each quadrant may represent values for a* and b* combinations that differ from the other quadrants. Within each quadrant is a center point C. Further, plane 604 includes a neutral point N that has an a* and b* value of (0,0). These five locations are identified within plane 604 for the colorant progression checking operations. At each of these five locations, the four color plane values are collected following the progress from minimum to maximum along the L* axis.

Figure 7:
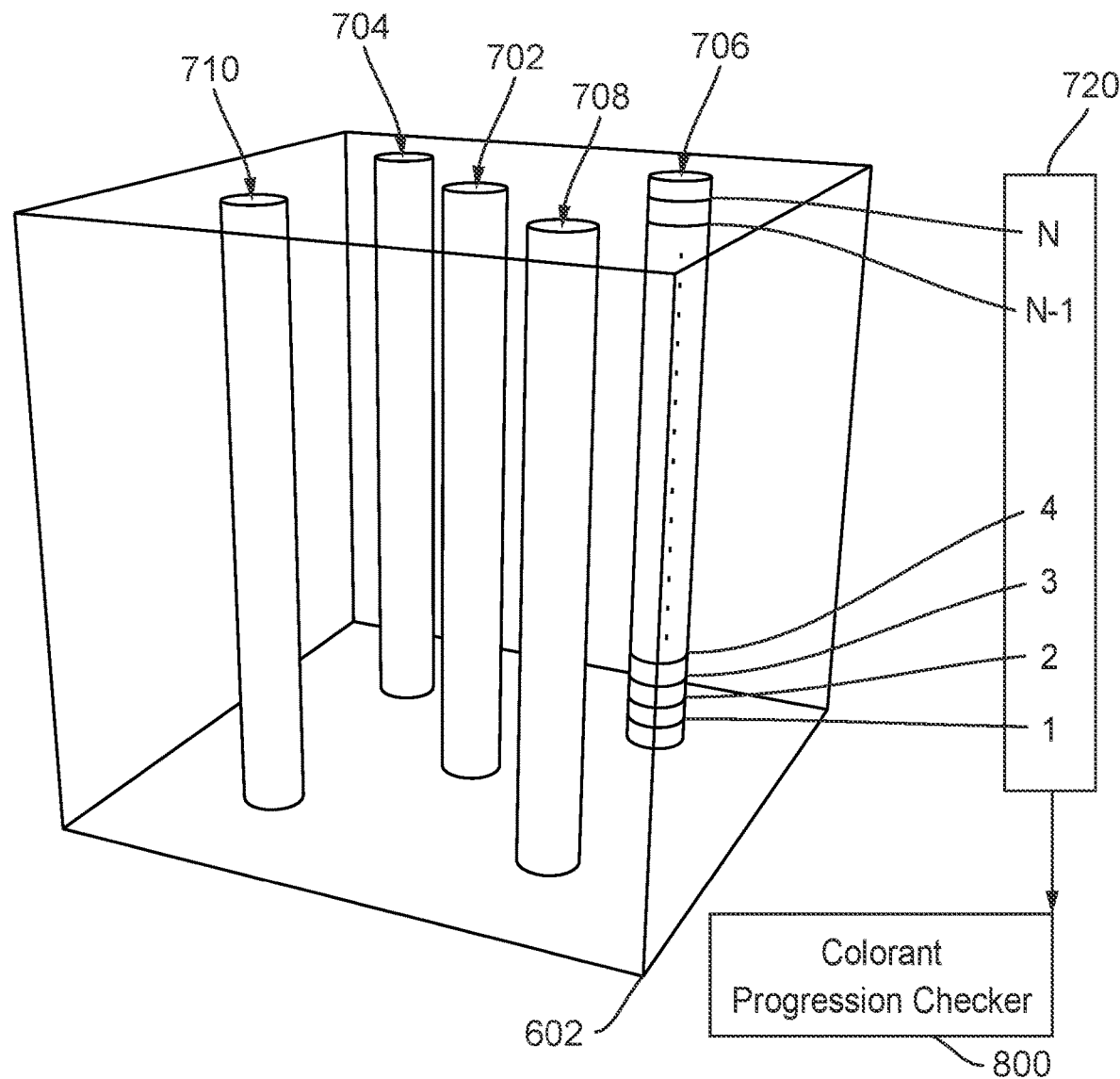
FIG. 7 illustrates the paths for the identified locations within a plane of the destination 3D-LUT for collecting values according to the disclosed embodiments.

FIG. 7 depicts ramps, or paths 702, 704, 706, 708, and 710, for the identified locations within plane 604 of destination 3D-LUT 602 for collecting values according to the disclosed embodiments. The path coincide with the five locations identified in plane 604. For example, path 702 corresponds to neutral point N located in the center of plane 604 and having an a* and b* value of (0,0). Path 704 corresponds to center point C of quadrant 606. Path 706 corresponds to center point C of quadrant 608. Path 708 corresponds to center point C of quadrant 610. Path 710 corresponds to center point C of quadrant 612.

Each quadrant may correspond to a L*a*b* hue quadrant. Quadrant 606 may correspond to a greenish hue. Quadrant 608 may correspond to a reddish hue. Quadrant 610 may correspond to a purplish hue. Quadrant 612 may correspond to cyanish hue. The disclosed embodiments take CMYK colorant samples 720 at these five paths of specific a* and b* combinations along paths of varying L* values through destination 3D-LUT table 602.

As shown in FIG. 7, path 706 may be representative of CMYK colorant samples 720 taken for colorant progression checking. Samples 720 may take N samples along path 706 as L* values increase through destination 3D-LUT 602. Discrete samples of sample 720 are shown along path 706. The discrete samples may be designated 1, 2, 3, 4, and so on up to sample N−1, and N. Any number of samples 720 may be taken along path 706. In some embodiments, the number of discrete samples may be related to the size of destination 3D-LUT 602 such that checker 800, disclosed below, will collect N data points of each of the four colorants for an N×N×N 3D-LUT. In other embodiments, the number of discrete samples may be between 17 to 20. Values for the primary colors of cyan, magenta, yellow, and black may be determined at each discrete sample. At least one of the values should be different between samples. For example, the CMYK values from discrete sample 1 should differ from the ones for discrete sample 2. The difference is measured and used to determine whether a significant number of rapid changes occur.

Figure 8:
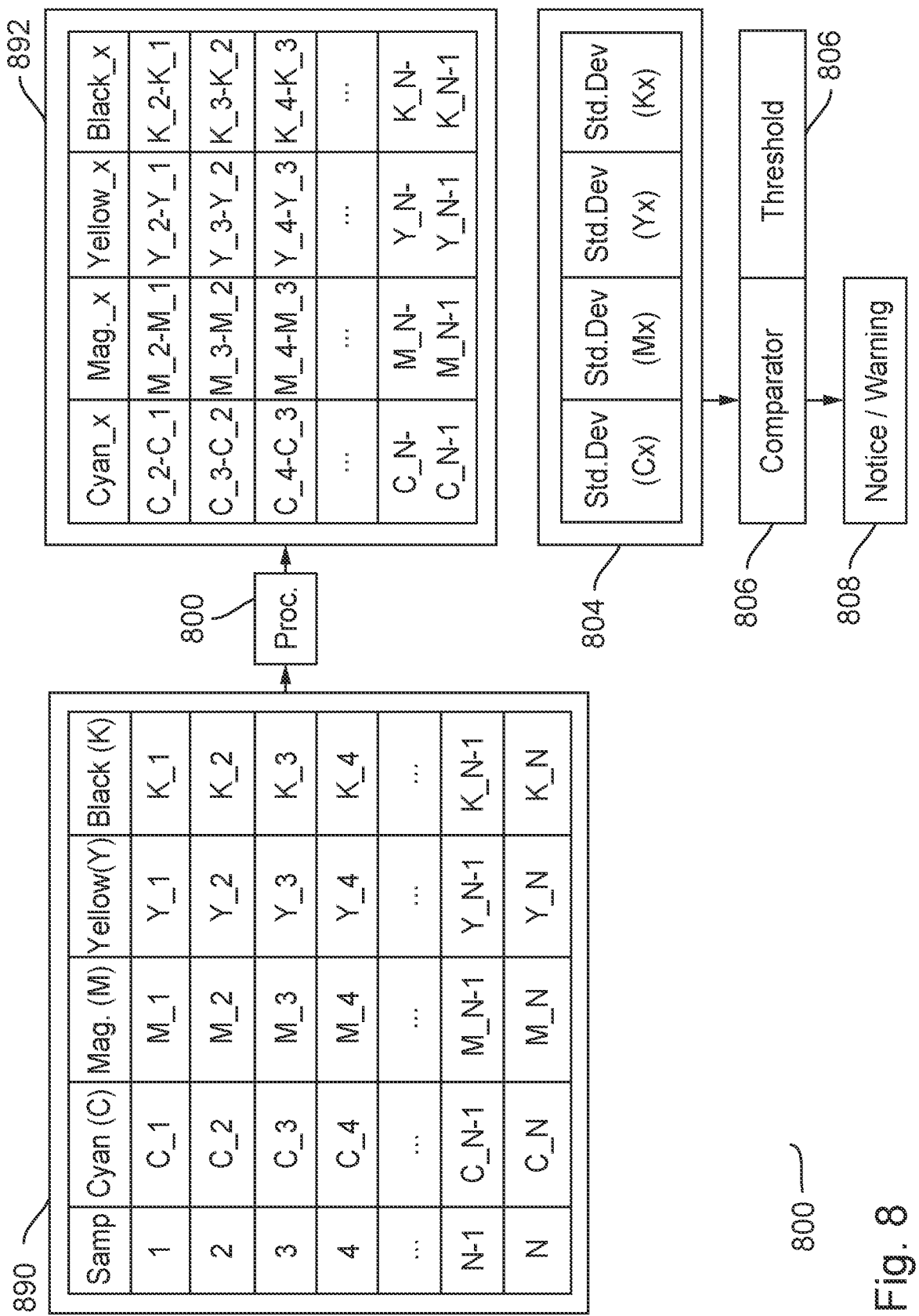
FIG. 8 illustrates a block diagram of a colorant progression checker according to the disclosed embodiments.

FIG. 8 depicts a block diagram of colorant progression checker 800 according to the disclosed embodiments. Checker 800 may be a component within printing device 104 or color management server 106 that performs the processes to determine whether a color conversion process may use the 1-step process disclosed above. Thus, checker 800 may be implemented in printing device 104, which stores the ICC profiles for paper media for use in color conversion. Alternatively, checker 800 may be implemented in another device within system 100.

Checker 800 includes Table 890 and Table 892. Each table may be a data file used within checker 800. The CMYK values detected by samples 720 are used to populate Table 890. For an N×N×N 3D-LUT, Table 890 may include entries for discrete samples 1 to N, as shown. Values for the primary colors of cyan, magenta, yellow, and black are detected at each sample point along path 706 as the L* values varies. These values populate Table 890 as shown.

For example, discrete sample 1 of samples 720 may have a cyan value of C_1, a magenta value of M_1, a yellow value of Y_1, and black value of K_1. Discrete sample 2, in turn, has a cyan value of C_2, a magenta value of M_2, a yellow value of Y_2, and a black value of K_2. Thus, each sample includes data points for all four primary colors. Data points populate Table 890 up to sample N, which has a cyan value of C_N, a magenta value of M_N, a yellow value of Y_N, and black value of K_N.

Processor 802 may be used to enable checker 800 to compute the differences between consecutive data points in Table 890. In some embodiments, processor 802 may be processor 202 of printing device 104. In other embodiments, processor 802 may be processor 312 of color management server 106. Further, processor 802 may be implemented in another device connected to printing device 104 to perform the disclosed processes on destination 3D-LUT 602.

Processor 802 populates Table 892 with the difference values between consecutive data points within samples 720. The differences may be tabulated within Table 892. The number of difference values for each primary color should be N−1 and will include entries for differences between discrete samples 1 and 2 up to samples N and N−1. As shown in Table 892, differences values for each primary color are determined. Difference values cyan_x are determined for C_2−C_1, C_3−C_2, C_4−C_3, and so on up to C_N−C_N−1. Difference values magenta_x are determined for M_2−M_1, M_3−M_2, M_4−M_3, and so on up to M_N−M_N−1. Difference values yellow_x are determined for Y_2−Y_1, Y_3−Y_2, Y_4−Y_3, and so on up to Y_N−Y_N−1. Difference values k_x for black are determined for K_2−K_1, K_3−K_2, K_4−K_3, and so on up to K_N−K_N−1.

The difference values cyan_x, magenta_x, yellow_x, and k_x are used to determine the standard deviations for the transitions between one discrete sample to the other. Processor 802 may determine standard deviations 804. Thus, standard deviation (Cx) is the standard deviation for N−1 transitions for cyan as samples 720 move along path 706. Standard deviation (Mx) is the standard deviation for N−1 transitions for magenta as samples 720 move along path 706. Standard deviation (Yx) is the standard deviation for N−1 transitions for yellow as samples 720 move along path 706. Standard deviation (Kx) is the standard deviation for N−1 transitions for black as samples 720 move along path 706.

Standard deviations 804 are determined for each path. Thus, paths 702, 704, 708, and 710 also have a set of standard deviations 804 for the primary colors based on samples 720 taken along those paths. For a L*a*b* to CMYK 3D-LUT, such as destination 3D-LUT 602, 20 standard deviations may be determined based on five paths and four primary colors.

Comparator 806 compares the sets of standard deviations 804 to indicate a status for each. If a standard deviation, such as standard deviation (Cx) for path 706, exceeds 20%, then it will have a status of fail or problematic. This status indicates a rapid change in colorant values within destination 3D-LUT 602 for that primary color. All 20 standard deviations 804 are analyzed by comparator 806. Comparator 806 then may use threshold 807 to determine if the number of failed standard deviations exceeds the specified threshold. Preferably, threshold 807 is four (4).

Thus, if four or more standard deviations 804 exceed 20% of the full range of these colorants, then destination 3D-LUT 602 of ICC profile 157 exhibits quick changes that will harm the precision of the 1-step conversion process. It may be advisable to forgo use of the 1-step process and use the 2-step process even though it takes longer. For colorants expressed as 8-bit quantities, 20% of 255 is 51. For colorants expressed in 16-bit quantities, 20% of 65535 is 13107. Thus, checker 800 may account for different bit sizes in performing its analysis.

Checker 800 may send a notice or warning 808 depending on the status of destination 3D-LUT 602. If the number of standard deviations exceeding 20% is less than threshold 807, then a notice may be sent to the operator that use of the 1-step color conversion process is acceptable. A message, for example, may be displayed on printing device 104. If the number of standard deviations exceeding 20% is equal to or greater than threshold 807, then a warning may be sent to the operator that the 1-step process is not recommended. The output CMYK color combination may not match the input CMYK color combination. The operator may wish to proceed with the 1-step color conversion process anyway, and can input a command to printing device 104 to do so.

Figure 9:
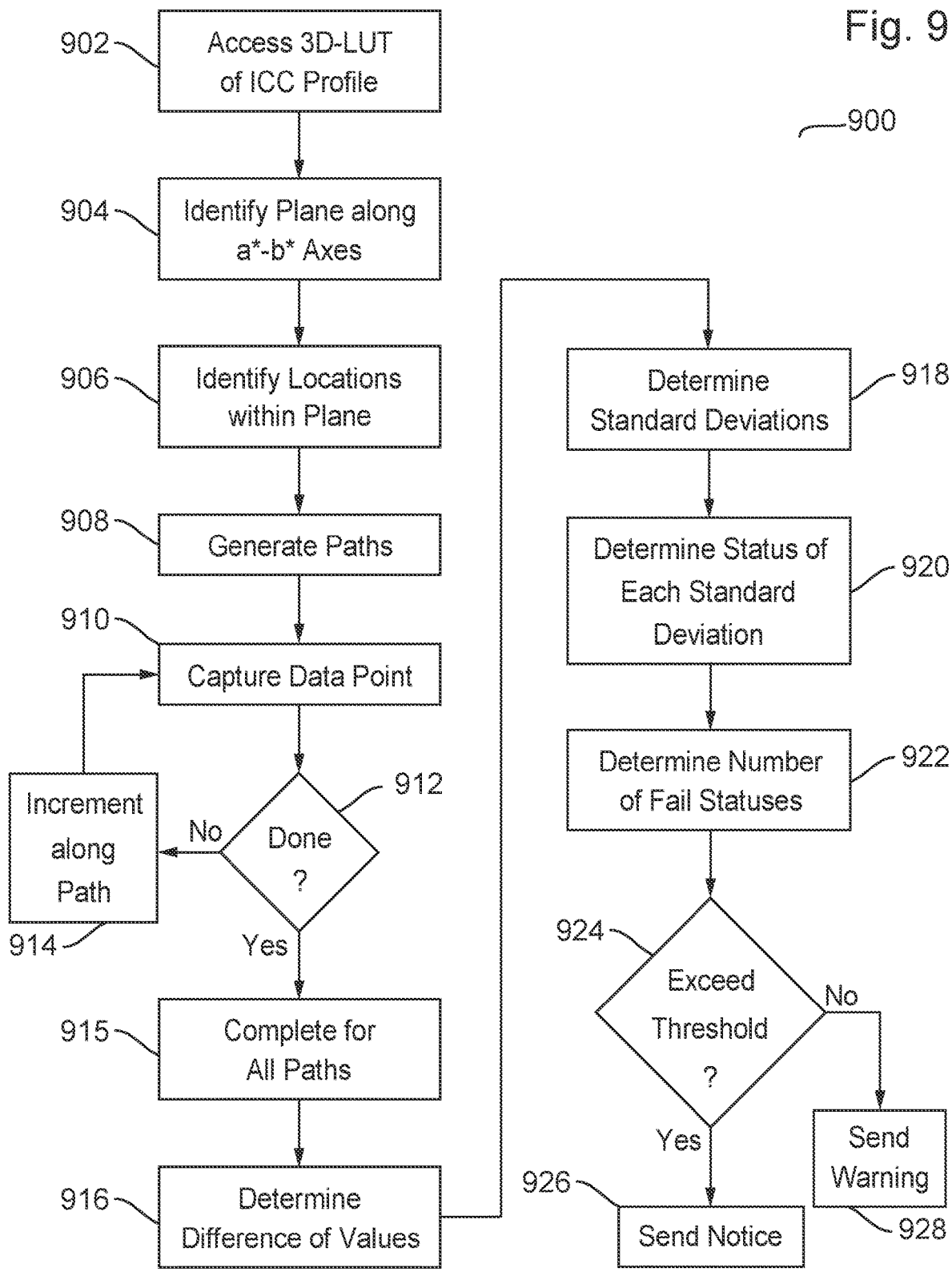
FIG. 9 illustrates a flowchart for checking ICC profile characteristics according to the disclosed embodiments.

FIG. 9 depicts a flowchart 900 for checking ICC profile characteristics according to the disclosed embodiments. Flowchart 900 may reference features of FIGS. 1-8 for illustrative purposed. Flowchart 900, however, is not limited to the features disclosed by FIGS. 1-8.

Step 902 executes by accessing destination 3D-LUT 602 of ICC profile 157. Preferably, ICC profile 157 is stored on printing device 104. Step 904 executes by identifying plane 604, which is a plane along the a* and b* axes within 3D-LUT 602. Step 906 executes by identifying locations within plane 604. These locations may be five locations as shown in FIG. 6. One location is neutral point N of plane 604 and the other locations may be center points C of the four quadrants of plane 604.

Step 908 executes by generating a path at each location. Each path extends perpendicularly to plane 604, or in the L* direction. Each path extends from a minimum value of L* to a maximum value for L*. Referring to FIGS. 6 and 7, path 702 is generated at neutral point N of plane 604. Path 704 is generated at center point C of quadrant 606. Path 706 is generated at center point C of quadrant 608. Path 708 is generated at center point C of quadrant 610. Path 710 is generated at center point C of quadrant 612.

Step 910 executes by capturing a data point, shown as one of samples 720 above, along a path, such as path 706. The data point may capture values for the primary colors at the discrete sample or data point along path 706. Step 912 executes by determining whether checker 800 is done capturing data points along the path. If no, then step 914 executes by incrementing along path 706 in the sampling direction to the next data point, or discrete sample. Flowchart 900 returns to step 910 by capturing that data point.

If step 912 is yes, then step 915 executes by completing the capturing of data points for all paths within destination 3D-LUT 602. Steps 910-914 may be repeated for each path. For each path, values for the data points may be placed in a data file similar to Table 890 disclosed above. Each data point, or discrete samples 1 through N, may include values for cyan, magenta, yellow, and black. Step 916 executes by determining the difference values for each colorant within each path. Table 2, disclosed above, discloses the difference values between data points.

Step 918 executes by determining standard deviations 804. Each colorant for each path will have a standard deviation value determined based on the respective difference values for that colorant. Step 918 should determine 20 standard deviations, or four colorants for each of the 5 paths. Step 920 executes by determining a status for each standard deviation. If the standard deviation value exceeds 20% of the full range of the colorant, then this colorant may have a fail status that indicates rapid changes in the values that will harm the precision of the 1-step process. Each of the 20 standard deviation values are checked.

Step 922 executes by determining the number of fail statuses for standard deviations 804. If 5 of the standard deviation values exceed 20%, then the number is 5. Step 924 executes by determining if the number of fail statuses exceed threshold 807. Preferably, threshold 807 is 4 such that if 4 or more standard deviations 804 have a fail status, then there may be problems with using the 1-step process. If step 924 is no, then step 926 executes by sending a notice to the operator that the 1-step process may be used for color conversion. If step 924 is yes, then step 928 executes by sending a warning to the operator that the color conversion involving ICC profile 157 should stick to the 2-step process. In other embodiments, printing device 104 may be configured to not allow the 1-step process with color conversion operations using ICC profile 157.

Thus, the disclosed embodiments provide a process to determine when it is appropriate to use the 1-step process for color conversion operations. As noted above, the 1-step process is faster than the 2-step process, which usually involves two conversion: source-to-PCS and PCS-to-destination. The 1-step process, however, excels in speed via construction of a LUT by sampling source-to-destination data and skipping the PCS. This source-to-destination sampling assumes that the B2A table in the destination ICC profile exhibits smooth transitions in the primary colorant values. Certain B2A 3D-LUT in destination ICC profiles may not be valid under this assumption and should be flagged according to the disclosed embodiments to prevent inefficient or poor quality color conversion.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" or "comprising," when used in this specification, specify the presence of stated features, integers, steps, operations, elements, or components, but do not preclude the presence or addition of one or more other features, integers, steps, operations, elements, components, and/or groups thereof.

Embodiments may be implemented as a computer process, a computing system or as an article of manufacture such as a computer program product of computer readable media. The computer program product may be a computer storage medium readable by a computer system and encoding computer program instructions for executing a computer process. When accessed, the instructions cause a processor to enable other components to perform the functions disclosed above.

The corresponding structures, material, acts, and equivalents of all means or steps plus function elements in the claims below are intended to include any structure, material or act for performing the function in combination with other claimed elements are specifically claimed. The description of the present invention has been presented for purposes of illustration and description, but is not intended to be exhaustive or limited to the invention in the form disclosed. Many modifications and variations will be apparent to those of ordinary skill without departing from the scope and spirit of the invention. The embodiment was chosen and described in order to best explain the principles of the invention and the practical application, and to enable others of ordinary skill in the art to understand the invention for embodiments with various modifications as are suited to the particular use contemplated.

One or more portions of the disclosed networks or systems may be distributed across one or more printing systems coupled to a network capable of exchanging information and data. Various functions and components of the printing system may be distributed across multiple client computer platforms, or configured to perform tasks as part of a distributed system. These components may be executable, intermediate or interpreted code that communicates over the network using a protocol. The components may have specified addresses or other designators to identify the components within the network.

It will be apparent to those skilled in the art that various modifications to the disclosed may be made without departing from the spirit or scope of the invention. Thus, it is intended that the present invention covers the modifications and variations disclosed above provided that these changes come within the scope of the claims and their equivalents.

The invention claimed is:

1. A method for checking certain ICC profile characteristics, the method comprising:
   accessing a look-up table associated with the ICC profile stored on a printing device;
   identifying a plurality of locations on a plane within the look-up table, wherein each location includes a path that extends from a minimum value to a maximum value in a direction perpendicular to the plane;
   collecting data points, each point is associated with multiple components, wherein each component is a numerical value within the look-up table along the path between the minimum value and the maximum value;
   determining a difference value between each pair of consecutive data points for each of the components within the path for each of the plurality of locations on the plane;
   calculating a standard deviation of the difference values of each of the components for the path; and
   determining that the ICC profile exhibits possible degradation in color reproduction if a specified number of the standard deviations exceeds a threshold.

2. The method of claim 1, wherein the look-up table is an N-dimensional look-up table.

3. The method of claim 1, wherein the plurality of locations includes five locations on the plane.

4. The method of claim 3, wherein the five locations include a neutral point and a center of each quadrant in the plane.

5. The method of claim 1, wherein collecting the data points includes collecting a plurality of values for each of four primary color components.

6. The method of claim 5, wherein the four primary color components are cyan, magenta, yellow, and black.

7. The method of claim 6, wherein a number of sets of the collected data points is twenty.

8. The method of claim 1, wherein collecting the data points includes progressing incrementally along the path from the minimum value to the maximum value at a set amount.

9. The method of claim 1, further comprising displaying a warning message on a printing device.

10. The method of claim 1, wherein the specified number of the standard deviations exceed 20% of a color range.

11. A method for determining potential color printing degradation, the method comprising:
- accessing a three-dimensional look-up table of a destination ICC profile stored on a printing device;
- identifying five locations on a plane within the look-up table, wherein the five locations include a neutral point and a center point of each quadrant of the plane;
- generating a path at each location, wherein the path extends perpendicularly to the plane at its respective location from a minimum value to a maximum value;
- capturing data points by varying values incrementally along the path at each respective location, wherein the data points correspond to values for each of four primary colors of cyan, magenta, yellow, and black;
- determining a difference value between consecutive points for each of the four primary colors at each of the respective locations;
- calculating a standard deviation for the difference values for each of the four primary colors at each of the respective locations for a total number of twenty standard deviations; and
- sending a warning if a number of the total number of standard deviations exceeds a threshold.

12. The method of claim 11, wherein sending the warning includes displaying the warning on a printing device.

13. The method of claim 11, wherein the threshold relates to 20% of the full range of each primary color.

14. The method of claim 11, wherein the threshold is four or more of the twenty standard deviations.

15. The method of claim 11, wherein the look-up table is a L*a*b* to CMYK look-up table.

16. The method of claim 15, wherein the plane is an a*-b* plane in the L*a*b* to CMYK look-up table.

17. A printing device comprising:
a processor; and
a memory connected to the processor, the memory stores instructions that, when executed by the processor, configures the printing device to
- access a look-up table associated with an ICC profile stored on the printing device;
- identify a plurality of locations on a plane within the look-up table, wherein each location includes a path that extends from a minimum value to a maximum value in a direction perpendicular to the plane;
- collect data points, each of the data points is associated with multiple components, wherein each of the components is a numerical value within the look-up table along the path between the minimum value and the maximum value;
- determine difference values between each pair of consecutive data points for each of the components within the path for each of the plurality of locations on the plane;
- calculate a standard deviation of the difference values of each of the components for the path; and
- determine that the ICC profile exhibits possible degradation in color reproduction if a specified number of the standard deviations exceeds a threshold.

18. The printing device of claim 17, wherein the instructions further configure the printing device to send a warning when the specified number of the standard deviations exceeds the threshold.

19. The printing device of claim 17, wherein the look-up table is a three-dimensional look-up table.

20. The printing device of claim 19, wherein the instructions further configures the printing device to collect the data points for a plurality of values includes collecting a number of data points for each of four primary colors.

* * * * *